(12) United States Patent
Zhang et al.

(10) Patent No.: US 9,936,426 B2
(45) Date of Patent: Apr. 3, 2018

(54) PROCESSING METHOD FOR RADIO LINK FAILURE, SMALL CELL AND MOBILE COMMUNICATION SYSTEM

(71) Applicant: Huawei Technologies Co., Ltd., Shenzhen (CN)

(72) Inventors: Lixue Zhang, Shenzhen (CN); Weiwei Song, Shenzhen (CN); Xin Xiong, Shenzhen (CN)

(73) Assignee: HUAWEI Technologies Co., Ltd., Shenzhen (CN)

( * ) Notice: Subject to any disclaimer, the term of this patent is extended or adjusted under 35 U.S.C. 154(b) by 115 days.

(21) Appl. No.: 14/668,419

(22) Filed: Mar. 25, 2015

(65) Prior Publication Data
US 2015/0201354 A1 Jul. 16, 2015

Related U.S. Application Data

(63) Continuation of application No. PCT/CN2012/081895, filed on Sep. 25, 2012.

(51) Int. Cl.
*H04W 36/00* (2009.01)
*H04W 36/30* (2009.01)
(Continued)

(52) U.S. Cl.
CPC ....... *H04W 36/0022* (2013.01); *H04W 36/30* (2013.01); *H04W 76/028* (2013.01); *H04W 36/04* (2013.01)

(58) Field of Classification Search
None
See application file for complete search history.

(56) References Cited

U.S. PATENT DOCUMENTS

2008/0240439 A1* 10/2008 Mukherjee ............ H04W 28/06
380/272
2010/0056157 A1* 3/2010 Verona .................. H04W 36/30
455/438
(Continued)

FOREIGN PATENT DOCUMENTS

CN 101500279 A 8/2009
CN 101562834 A 10/2009
(Continued)

OTHER PUBLICATIONS

Office Action in corresponding Chinese Patent Application No. 201280002140.1 (Nov. 2, 2016).

*Primary Examiner* — Christopher Crutchfield
*Assistant Examiner* — Alan Lindenbaum
(74) *Attorney, Agent, or Firm* — Leydig, Voit & Mayer, Ltd.

(57) ABSTRACT

The present invention provides a processing method for a radio link failure, a small cell and a mobile communication system. The method includes: determining, by a small cell, whether or not a signaling radio bearer transmission connection between a user equipment and a macro base station is interrupted; receiving, if the signaling radio bearer transmission connection is interrupted, signaling radio bearer configuration parameters sent by the macro base station, wherein the signaling radio bearer configuration parameters comprise an SRB identification, a radio link control layer configuration and a logic channel configuration; establishing a signaling radio bearer for the user equipment according to the signaling radio bearer configuration parameters; and notifying the user equipment to hand over the signaling radio bearer transmission connection to the signaling radio bearer established by the small cell. In the present invention, (Continued)

service interruption time of the UE is reduced and continuity of service is guaranteed.

17 Claims, 7 Drawing Sheets

(51) Int. Cl.
*H04W 76/02* (2009.01)
*H04W 36/04* (2009.01)

(56) References Cited

U.S. PATENT DOCUMENTS

| 2011/0090869 | A1 | 4/2011 | Tian et al. |
| 2011/0124340 | A1* | 5/2011 | Puttonen ........... H04W 36/0083 455/437 |
| 2011/0294508 | A1 | 12/2011 | Min et al. |
| 2012/0164952 | A1 | 6/2012 | Lee et al. |

FOREIGN PATENT DOCUMENTS

| CN | 101572906 A | 11/2009 |
| CN | 101965035 A | 2/2011 |
| CN | 102595640 A | 7/2012 |
| WO | WO 2012111992 A1 | 8/2012 |

\* cited by examiner

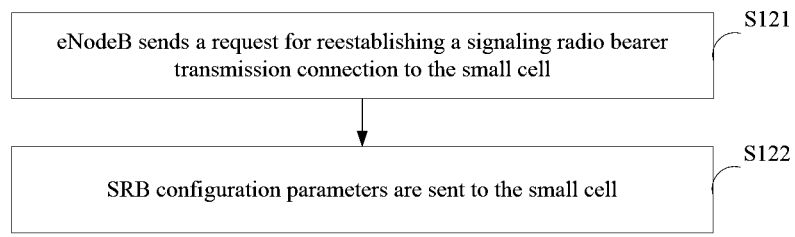
Fig. 12
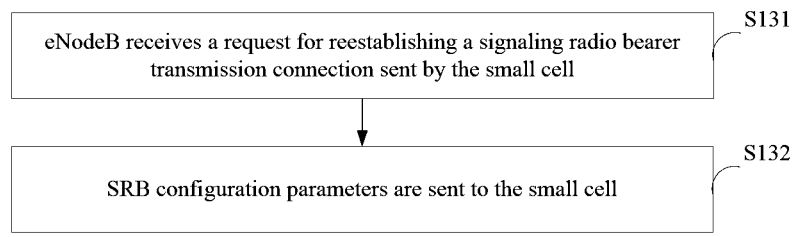
Fig. 13
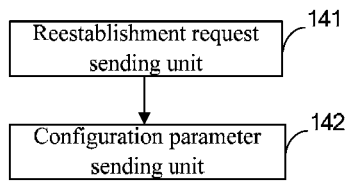 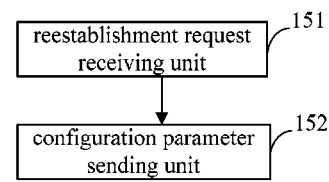
Fig. 14      Fig. 15

US 9,936,426 B2

PROCESSING METHOD FOR RADIO LINK FAILURE, SMALL CELL AND MOBILE COMMUNICATION SYSTEM

CROSS-REFERENCE TO RELATED APPLICATIONS

This application is a continuation of International Patent Application No. PCT/CN2012/081895, filed on Sep. 25, 2012, which is hereby incorporated by reference in its entirety.

FIELD OF TECHNOLOGY

The present invention relates to the technical filed of mobile communications, and in particular to a processing method for a radio link failure, a small cell and a mobile communication system.

BACKGROUND OF THE INVENTION

With the rise of an intelligent terminal such as a smart phone, a tablet computer, and the like, all the past applications on the Internet will be reproduced on a mobile terminal. Current 2G/3G network has been unable to satisfy the requirement of mobile data service of a plenty of intelligent terminals. A rise of Long Term Evolution (Long Term Evolution, LTE) greatly broadens a bandwidth of the network, and a rate experience of 100 Mbps may be provided for a user in case of a 20 MHz of spectral bandwidth. However, a great challenge is still posed to the network for a densely populated area such as a shopping center, a station, an airport, a crowded section of a highway, and so on.

Wireless fidelity offload (Wi-Fi Offload, wireless fidelity Offload) which is currently a hot topic, is a good idea, whereby WiFi hot-spots are widely deployed in a densely populated area, and a Wi-Fi communication may be activated when a user needs a wideband data service. Wi-Fi, a wireless local network standard developed and maintained by a WiFi Alliance of IEEE, is a wireless communication technology with short distance, and is capable of supporting a radio electric signal accessed from the Internet within a range of hundreds of feet. The advantages of deploying the Wi-Fi lie in freedom, flexibility, and the use of free frequency spectrums without being charged, while with the disadvantage of difficult to be regulated by an operator.

Therefore, an urgent problem to be faced is to provide a network standard with wireless short-distance and hot-spot coverage that is capable of meeting the requirements of the operators. Currently, 3GPP gradually improves establishment of a standard for a pico cell (pico cell), a micro cell (micro cell) and the like. For network coverage, pico cell coverage will be added in a hot-spot area so as to achieve an offload of user data and to prevent a large number of users from performing data transmissions on a macro network at a same time. In such coverage scenario, behaviors of both an intelligent terminal and the network will be changed, and when an intelligent terminal moves into a pico cell, the intelligent terminal may select to reside in the pico cell or still reside in a macro cell while the service data being transmitted through the pico cell.

An indoor wireless hot-spot small cell (Small cell) coverage technology is a service offload access point similar to a pico cell. A small cell is mainly deployed under a macro cell to provide a broadband data offload service with low mobility on a hot-spot. In the case that a small cell whose control plane and user plane are separated is jointly deployed with a macro base station (eNodeB), a connection relationship between a user equipment (User Equipment, UE), the small cell and the eNodeB are as shown in FIG. 1. Link 1 is a connection between the UE and the eNodeB, and link 2 is a connection between the UE and the small cell. A control plane of the UE, that is, signaling radio bearers ((Signaling Radio Bearer, SRB) 0, SRB 1, and SRB 2), are established on the eNodeB, while a data radio bearer (Data Radio Bearer, DRB) is established on the small cell for service offload. The UE transmits control signaling through the eNodeB, and transmits service data through the small cell. In a current LTE network, after establishing a radio resource control (Radio Resource Control, RRC) connection with the eNodeB, the UE needs to detect in-sync/out-of-sync condition of a radio link continuously, and to report an in-sync/out-of-sync indication to an RRC layer. The RRC layer determines whether or not a radio link failure occurs. The RRC layer performs a radio link evaluation by employing a method in which a UE physical layer monitors signal quality of a customized ringing signal (Customized Ringing Signal, CRS), and detects signal condition of a downlink radio link of a serving cell. The UE evaluates downlink radio link quality, and compares the downlink radio link quality with a set threshold Qin/Qout. If the downlink radio link quality of the serving cell is worse than the Qout during an evaluation period, the physical layer reports an out-of-sync (Out-of-Sync) indication to the RRC layer. If the signal quality of the serving cell is higher than the Qin during the evaluation period, the physical layer reports an in-sync (In-sync) indication to the RRC layer. If the signal quality of the serving cell neither satisfies the condition for reporting the in-sync indication nor satisfies the condition for reporting the out-of-sync indication during the evaluation period, the physical layer would not report an indication to the RRC layer. A time interval between two consecutive reports of the in-sync/out-of-sync indications should be no less than 10 ms when the UE is in a non-discontinuous reception (Discontinuous Reception, DRX) state, and takes a maximum value of 10 ms and a DRX period when the UE is in a DRX state.

A process for recovering a radio link of the RRC layer provided by the prior art includes a first phase (First Phase) and a second phase (Second Phase), wherein the first phase is divided into the following two parts:

a phase for detecting a problem of the physical layer: if the RRC layer receives a number 'N310' of consecutive out-of-sync indications, then the RRC layer detects a problem in the UE's physical layer and starts T310, that is, a phase for recovering the problem of the physical layer starts; and the phase for recovering the problem of the physical layer: if the RRC layer receives a number 'N311' of consecutive in-sync indications during a running period of the T310, the UE assumes that the problem in the physical layer has been recovered, and then stops the T310; and when the T310 expires, the UE starts T311, that is, a process for reestablishing the RRC connection starts.

When a failure of the radio link 1 in FIG. 1 occurs, the UE may attempt a process for recovering the radio link as shown in FIG. 2. If it is found that the failed radio link can not be recovered during the second phase of this process, the UE would go into an IDLE state according to a conventional mode, and stop current ongoing service transmission.

In one word, in the scenario that the small cell and the eNodeB are jointly deployed, a design idea of separating the control plane and the user plane enables effective reduce in occurrence probabilities of handing over, that is, after entering into a coverage area of the small cell, a UE just establishes a data bearer on the small cell without executing a handover command. Similarly, when the UE moves out of the coverage area of the small cell, it is also unnecessary to execute the handover operation. However, according to a conventional method for processing a radio link failure, if the radio link between the UE and the eNodeB is failed when the UE transmits data on the small cell, and the UE can not recover the radio link connection with the eNodeB, the UE needs to return to an RRC_IDLE state, while at this time, the data link between the UE and the small cell is normal and data transmission still can be performed. Therefore, the conventional method for processing the radio link failure is not suitable for the scenario that the control and the data are separated from each other under coordinated work of the macro cell and the pico cell.

SUMMARY OF THE INVENTION

The embodiments of the present invention provide a processing method for a radio link failure, a small cell and a mobile communication system, intending to solve the problem that the processing method for the radio link failure provided by the prior art is not suitable for the scenario that the control and the data are separated from each other under coordinated work of the macro cell and the pico cell.

In one aspect, a processing method for a radio link failure is provided, which includes:

determining, by a small cell, whether or not a signaling radio bearer transmission connection between a user equipment and a macro base station is interrupted;

receiving, if the signaling radio bearer transmission connection is interrupted, signaling radio bearer configuration parameters sent by the macro base station, wherein the signaling radio bearer configuration parameters comprise a signaling radio bearer (SRB) identification, a radio link control layer configuration and a logic channel configuration;

establishing a signaling radio bearer for the user equipment according to the signaling radio bearer configuration parameters; and notifying the user equipment to hand over the signaling radio bearer transmission connection between the user equipment and the macro base station to the signaling radio bearer established by the small cell.

In another aspect, a small cell is provided, which includes:

an interruption determining unit for determining whether or not a signaling radio bearer transmission connection between a user equipment and a macro base station is interrupted;

a configuration parameter receiving unit for receiving signaling radio bearer configuration parameters sent by the macro base station when the interruption determining unit determines that the signaling radio bearer transmission connection between the user equipment and the macro base station is interrupted, wherein the signaling radio bearer configuration parameters comprise a signaling radio bearer (SRB) identification, a radio link control layer configuration and a logic channel configuration;

a bearer establishing unit for establishing a signaling radio bearer for the user equipment according to the signaling radio bearer configuration parameters; and a handover notifying unit for notifying the user equipment to hand over the signaling radio bearer transmission connection between the user equipment and the macro base station to the signaling radio bearer established by the small cell.

In another aspect, a processing method for a radio link failure is provided, which includes:

sending, by a macro base station, signaling radio bearer (SRB) configuration parameters to a small cell.

In another aspect, a macro base station is provided, which includes:

a configuration parameter sending unit for sending signaling radio bearer (SRB) configuration parameters to a small cell.

In another aspect, a processing method for a radio link failure is provided, which includes:

sending, by a user equipment (UE), a small cell a notification that a signaling radio bearer transmission connection is interrupted such that the small cell establishes a signaling radio bearer (SRB) for the UE; and receiving a notification for handing over the SRB to the small cell sent by the small cell.

In another aspect, a user equipment is provided, which includes:

an interruption notification sending unit for sending a small cell a notification that a signaling radio bearer transmission connection is interrupted such that the small cell establishes a signaling radio bearer (SRB) for the UE; and a handover notification receiving unit for receiving a notification for handing over the SRB to the small cell sent by the small cell.

In another aspect, a mobile communication system is provided, which includes:

the macro base station as described above, and further includes the small cell as described above, wherein the small cell is deployed in a macro cell covered by the macro base station.

In the embodiments of the present invention, a control plane is temporarily provided by means of a new signaling radio bearer established by the small cell, thus reducing service interruption time of the UE and guaranteeing continuity of service, and effectively guaranteeing the coverage capacity of the network by the temporary control plane support provided by the small cell.

BRIEF DESCRIPTION OF THE DRAWINGS

FIG. 12 is an implementing flowchart of a processing method for a radio link failure provided by a tenth embodiment of the present invention;

FIG. 13 is an implementing flowchart of a processing method for a radio link failure provided by an eleventh embodiment of the present invention;

FIG. 14 is a block diagram of a structure of a macro base station provided by a twelfth embodiment of the present invention;

FIG. 15 is a block diagram of a structure of a macro base station provided by a thirteenth embodiment of the present invention;

DETAILED DESCRIPTION OF THE EMBODIMENTS

In order to make the objects, technical solution and advantages of the present invention more clearly, the present invention will be described in more detail below in conjunction with the accompanying drawings and embodiments. It should be appreciated that the specific embodiments described herein are merely used for explaining, rather than for limiting, the present invention.

Figure 1:
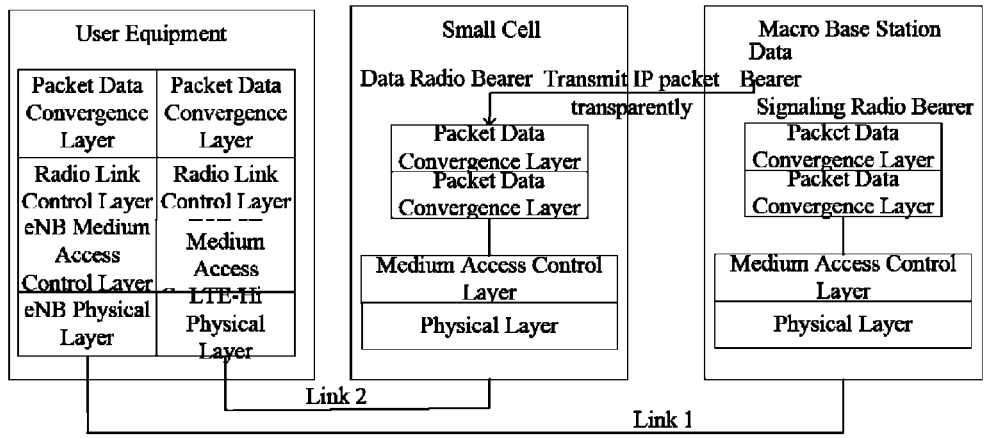
FIG. 1 is a schematic diagram of a connection relationship between a user equipment (UE), a small cell and an eNodeB.
Figure 2:
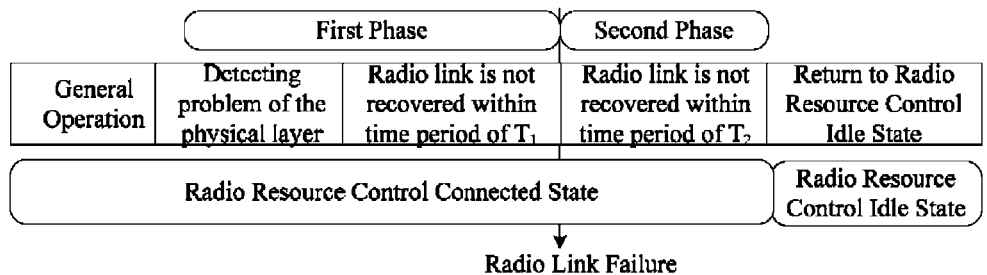
FIG. 2 is a schematic diagram of a process for recovering a radio link provided by the prior art.

In the embodiments of the present invention, since link 2 between a small cell and a UE in the network in FIG. 1 is intact, a control plane is temporarily provided by means of a new signaling radio bearer established by the small cell, thus reducing service interruption time of the UE and guaranteeing continuity of service, and the coverage capacity of the network is effectively guaranteed by the temporary control plane support provided by the small cell.

Implementations of the present invention are described hereinafter in detail in conjunction with specific embodiments.

First Embodiment

Figure 3:
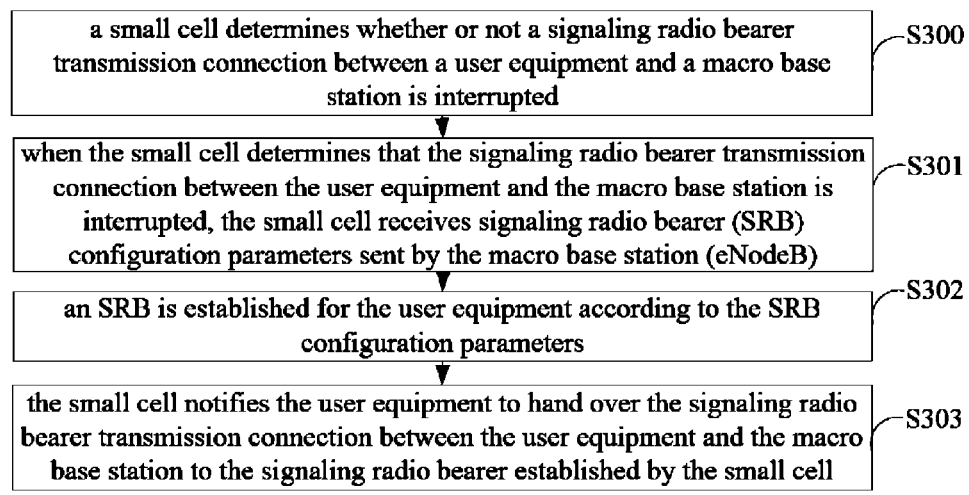
FIG. 3 is an implementing flowchart of a processing method for a radio link failure provided by a first embodiment of the present invention.

FIG. 3 shows an implementing procedure of a processing method for a radio link failure provided by the first embodiment of the present invention. By taking a small cell side as an example, details of the procedure are described as follows.

In step S300, a small cell determines whether or not a signaling radio bearer transmission connection between a user equipment and a macro base station is interrupted.

In the present embodiment, it is possible that the UE firstly detects that a control plane radio link between the UE and the eNodeB is failed, or the eNodeB firstly detects the control plane radio link between the UE and the eNodeB is failed.

When the UE firstly detects that the control plane radio link with the eNode is failed, the UE and the eNodeB perform an SRB transmission connection reestablishment. After the reestablishment is failed, instead of returning to an RRC_IDLE state, the UE initiates a request for reestablishing an SRB transmission connection to the small cell, and the small cell establishes the SRB transmission connection with the UE according to SRB configuration parameters received from the eNodeB.

When the eNodeB firstly detects that the control plane radio link with the UE is failed and the UE has not found that the control plane radio link with the eNodeB is failed yet, the eNodeB directly instructs the small cell to perform an SRB transmission connection reestablishment for the UE, and the small cell establishes, according to SRB configuration parameters received from the eNodeB, the SRB transmission connection of the UE on a signaling radio bearer established by the small cell.

In step S301, when the small cell determines that the signaling radio bearer transmission connection between the user equipment and the macro base station is interrupted, the small cell receives signaling radio bearer (SRB) configuration parameters sent by the macro base station (eNodeB), wherein the signaling radio bearer configuration parameters include a signaling radio bearer (SRB) identification, a radio link control layer configuration and a logic channel configuration.

In step S302, an SRB is established for the user equipment according to the SRB configuration parameters.

In the present embodiment, the small cell multiplexes the SRB configuration parameters of the eNodeB to establish its own SRB, wherein the SRB configuration parameters specifically include an SRB identification, a radio link control (Radio Link Control, RLC) layer configuration and a logic channel configuration.

In step S303, the small cell notifies the user equipment to hand over the signaling radio bearer transmission connection between the user equipment and the macro base station to the signaling radio bearer established by the small cell.

In the present embodiment, since a small cell air interface does not have a logic channel such as a common control channel (Common Control Channel, CCCH), a dedicated control channel (Dedicated Control Channel, DCCH) and the like, a dedicated traffic channel (Dedicated Traffic Channel, DTCH) of the small cell is used for a transmission of the SRB, and a control plane connection between the small cell and the UE is temporarily provided by the SRB.

In the present embodiment, when the control plane radio link between the UE and the eNodeB is failed, the small cell establishes SRB for the user equipment (UE) according to the signaling radio bearer (SRB) configuration parameters sent by the eNodeB, and the control plane connection is temporarily provided by the SRB, thereby reducing service interruption time of the UE and ensuring continuity of service. Moreover, the temporary control plane support provided by the small cell effectively guarantees a coverage capacity of the network.

Second Embodiment

Figure 4:
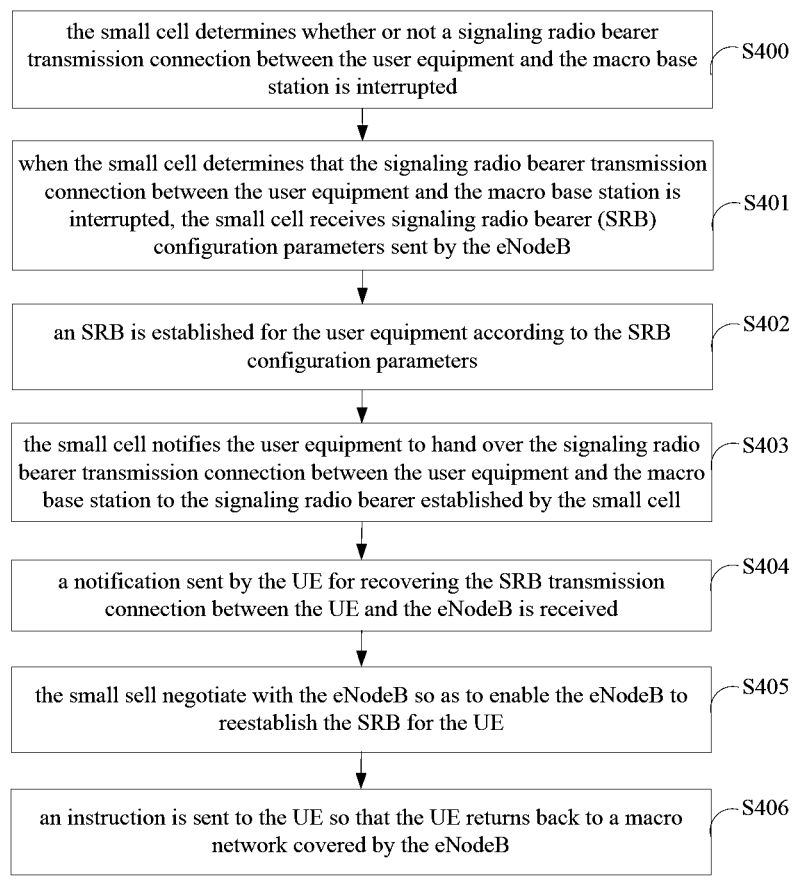
FIG. 4 is an implementing flowchart of a processing method for a radio link failure provided by a second embodiment of the present invention.

FIG. 4 shows an implementing procedure of a processing method for a radio link failure provided by the second embodiment of the present invention. Taking a small cell side as an example, a RRC connection between a UE and an eNodeB can be automatically recovered by employing the method when signal strength of a signal transmitted by the eNodeB is higher than a preset threshold, the details of which are described as follows.

In step S400, the small cell determines whether or not a signaling radio bearer transmission connection between the user equipment and the macro base station is interrupted.

In step S401, when the small cell determines that the signaling radio bearer transmission connection between the user equipment and the macro base station is interrupted, the small cell receives signaling radio bearer (SRB) configuration parameters sent by the eNodeB.

In step S402, an SRB is established for the user equipment according to the SRB configuration parameters.

In step S403, the small cell notifies the user equipment to hand over the signaling radio bearer transmission connection between the user equipment and the macro base station to the signaling radio bearer established by the small cell.

In step S404, a notification sent by the UE for recovering the SRB transmission connection between the UE and the eNodeB is received.

In the present embodiment, when the UE receives control signaling transmitted by the small cell through an SRB, a periodic measurement on signal strength of a signal of the eNodeB is started at a same time, and if the UE detects that the signal strength of the signal transmitted by the eNodeB is higher than a preset threshold, the UE attempts to recover the SRB transmission connection with the eNodeB.

In step S405, the small sell negotiate with the eNodeB so as to enable the eNodeB to reestablish the SRB for the UE.

In the present embodiment, when the UE detects that the signal strength of the signal transmitted by the eNodeB is higher than the preset threshold, the UE notifies, through a MAC CE, the small cell to return the SRB transmission connection back to the eNodeB. After an LTE-Hi negotiates with the eNodeB and establishes the SRB, the eNodeB establishes the SRB transmission connection between the eNodeB and the UE according to the SRB.

In step S406, an instruction is sent to the UE so that the UE returns back to a macro network covered by the eNodeB.

In the present embodiment, the small cell sends to the UE the instruction that the SRB transmission connection between the eNodeB and the UE is established, and notifies the UE to return back to the macro network covered by the eNodeB.

In the present embodiment, when the UE detects that the strength of the signal transmitted by the eNodeB is higher than the preset threshold, the UE notifies the small cell to return the SRB transmission connection back to the eNodeB, and after the SRB transmission connection between the eNodeB and the UE is reestablished, the UE can return back to the macro network covered by the eNodeB again.

Third Embodiment

Figure 5:
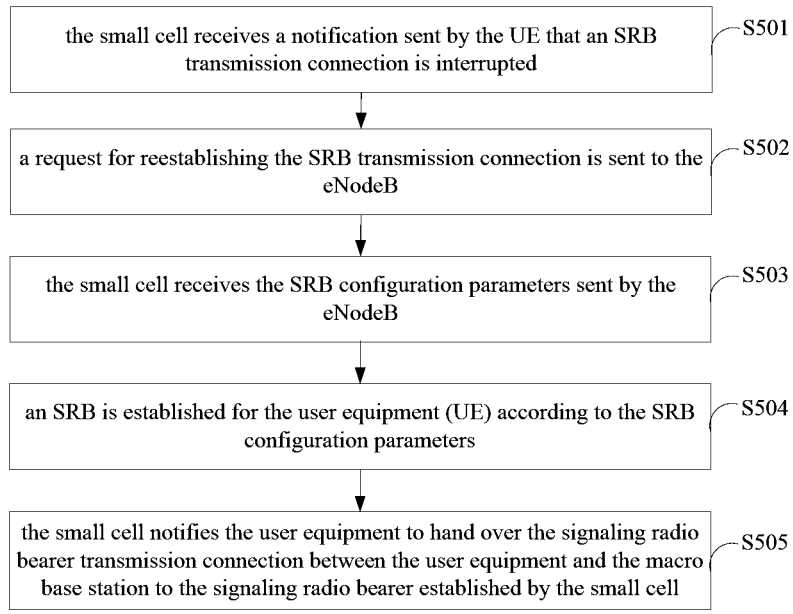
FIG. 5 is an implementing flowchart of a processing method for a radio link failure provided by a third embodiment of the present invention.

FIG. 5 shows an implementing procedure of a processing method for a radio link failure provided by the third embodiment of the present invention. By taking a small cell side as an example, the method is suitable for a scenario that UE firstly detects that a control plane radio link between the UE and an eNodeB is failed. The details of the method are described as follows.

In step S501, the small cell receives a notification sent by the UE that an SRB transmission connection is interrupted.

In the present embodiment, when the UE detects that the control plane radio link with the eNodeB is failed and after a reestablishment of the SRB transmission connection performed by the UE and the eNodeB is failed, the UE notifies, through a control element (Control Element, CE) of a media access control (Media Access Control, MAC) layer, the small cell that the SRB transmission connection between the UE and the eNodeB is interrupted and the SRB transmission connection needs to be reestablished on the small cell. After receiving the notification sent by the UE, the small cell sends a request for establishing the SRB transmission connection of the UE to the eNodeB.

In step S502, a request for reestablishing the SRB transmission connection is sent to the eNodeB.

In the present embodiment, after the small cell receives the notification sent by the UE that the SRB transmission connection is interrupted, the small cell sends a request to the eNodeB for establishing the SRB transmission connection of the UE. After the eNodeB receives the request, the eNodeB sends SRB configuration parameters to the small cell.

In step S503, the small cell receives the SRB configuration parameters sent by the eNodeB.

In step S504, an SRB is established for the user equipment (UE) according to the SRB configuration parameters.

In step S505, the small cell notifies the user equipment to hand over the signaling radio bearer transmission connection between the user equipment and the macro base station to the signaling radio bearer established by the small cell.

Fourth Embodiment

Figure 6:
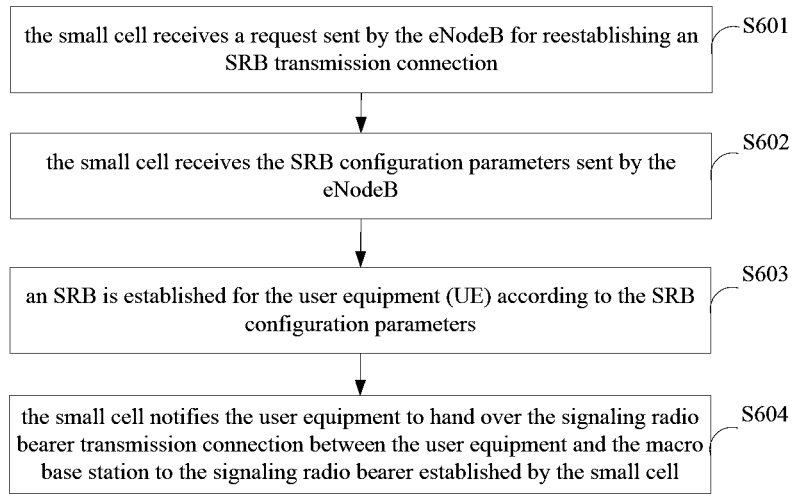
FIG. 6 is an implementing flowchart of a processing method for a radio link failure provided by a fourth embodiment of the present invention.

FIG. 6 shows an implementing procedure of a processing method for a radio link failure provided by the fourth embodiment of the present invention. Taking a small cell side as an example, the method is suitable for a scenario that an eNodeB directly instructs, when the eNodeB firstly detects that a control plane radio link with the UE is failed and the UE has not found that the control plane radio link is failed yet, the small cell to reestablish an RRC connection of the UE, so as to establish the RRC connection of the UE on the small cell. Details of the method are described as follows.

In step S601, the small cell receives a request sent by the eNodeB for reestablishing an SRB transmission connection.

In the present embodiment, when the eNodeB detects that the control plane radio link with the UE is failed, the eNodeB requests the small cell to reestablish the SRB transmission connection for the UE, and sends SRB configuration parameters to the small cell.

In step S602, the small cell receives the SRB configuration parameters sent by the eNodeB.

In step S603, an SRB is established for the user equipment (UE) according to the SRB configuration parameters.

In step S604, the small cell notifies the user equipment to hand over the signaling radio bearer transmission connection between the user equipment and the macro base station to the signaling radio bearer established by the small cell.

In the present embodiment, after the small cell establishes the SRB according to the SRB configuration parameters sent by the eNodeB, the small cell notifies the UE through a MAC CE to hand over the signaling radio bearer transmission connection between the user equipment and the macro base station to the signaling radio bearer established by the small cell, and the small cell may then transmit control signaling to the UE through the established SRB.

Fifth Embodiment

Figure 7:
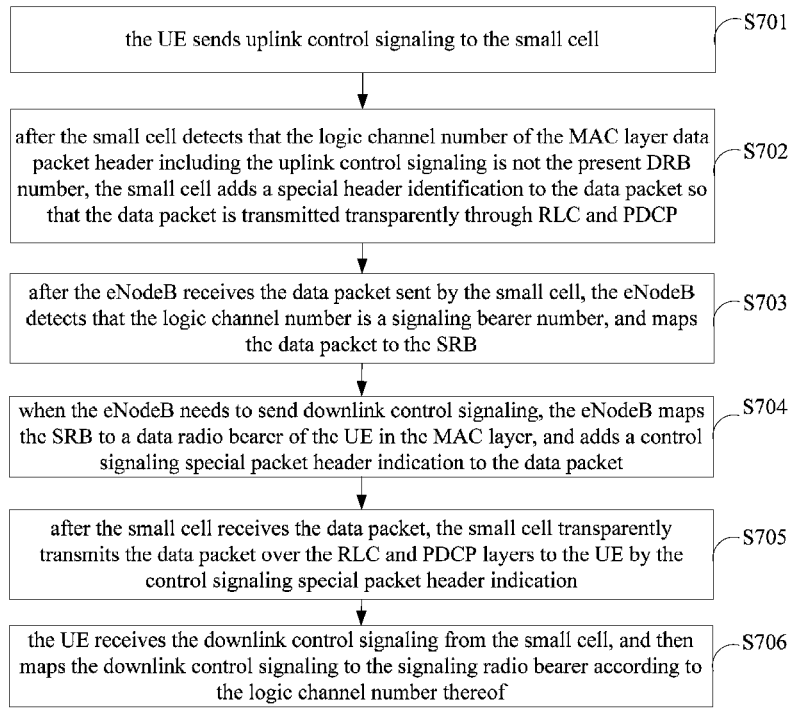
FIG. 7 is an implementing flowchart of a processing method for a radio link failure provided by a fifth embodiment of the present invention.

FIG. 7 shows an implementing procedure of a processing method for a radio link failure provided by the fifth embodiment of the present invention. Unlike the first to fourth embodiments, it is unnecessary to establish signaling radio bearers SRB0, SRB1 and SRB2 on the small cell in the present embodiment. After the UE detects that the radio link between the UE and the eNodeB is failed and the UE can not complete radio link reestablishment on the eNodeB, the UE automatically hands over the SRB bearer to the small cell. Details of the procedure are described as follows:

In step S701, the UE sends uplink control signaling to the small cell.

In the present embodiment, the UE sends the uplink control signaling to the small cell through the link 2, and a logic channel number of a MAC layer data packet header including the uplink control signaling employs a logic channel number of an SRB transmission.

In step S702, after the small cell detects that the logic channel number of the MAC layer data packet header including the uplink control signaling is not number of a DRB established on the present small cell, the small cell adds a special header identification to the data packet so that the data packet is transmitted transparently through RLC and packet data convergence protocol (Packet Data Convergence Protocol, PDCP).

In the present embodiment, a DRB channel of the UE on the small cell is employed to transmit the MAC layer data packet header including the uplink control signaling, and the logic channel number of the SRB transmission is still employed as the logic channel number of the MAC layer data packet header.

In step S703, after the eNodeB receives the data packet sent by the small cell, the eNodeB detects that the logic channel number is a signaling bearer number, and maps the data packet to the SRB. Transmission of the uplink control signaling is completed.

In step S704, when the eNodeB needs to send downlink control signaling, the eNodeB maps the SRB to a data radio bearer of the UE (user plane protocol stack between the eNodeB and the small cell) in the MAC layer, and adds a control signaling special packet header indication to the data packet.

In step S705, after the small cell receives the data packet, the small cell transparently transmits the data packet over the RLC and PDCP layers to the UE by the control signaling special packet header indication.

In step S706, the UE receives the downlink control signaling from the small cell, and then maps the downlink control signaling to the signaling radio bearer according to the logic channel number thereof.

Sixth Embodiment

Figure 8:
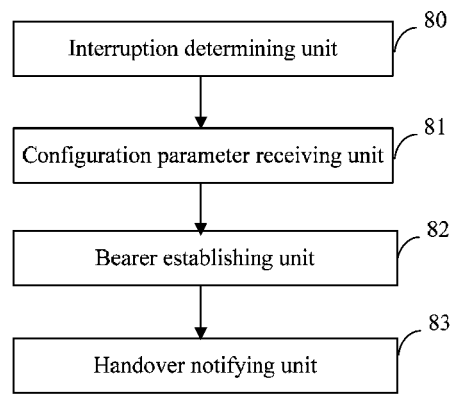
FIG. 8 is a block diagram of a structure of a small cell provided by a sixth embodiment of the present invention.

FIG. 8 shows a block diagram of a specific structure of a small cell provided by the sixth embodiment of the present invention, in which only a part related to the embodiment of the present invention is depicted so as to facilitate illustration. In the present embodiment, the small cell includes an interruption determining unit 80, a configuration parameter receiving unit 81, a bearer establishing unit 82 and a handover notifying unit 83.

The interruption determining unit 80 is used for determining whether or not a signaling radio bearer transmission connection between a user equipment and a macro base station is interrupted.

When the interruption determining unit 80 determines that the signaling radio bearer transmission connection between the user equipment and the macro base station is interrupted, the configuration parameter receiving unit 81 receives signaling radio bearer configuration parameters sent by the macro base station, wherein the signaling radio bearer configuration parameters include a signaling radio bearer (SRB) identification, a radio link control layer configuration, and a logic channel configuration.

The bearer establishing unit 82 is used for establishing a signaling radio bearer for the user equipment according to the signaling radio bearer configuration parameters received by the configuration parameter receiving unit 81.

After the bearer establishing unit 82 establishes the signaling radio bearer for the user equipment, the handover notifying unit 83 notifies the user equipment to hand over the signaling radio bearer transmission connection between the user equipment and the macro base station to the signaling radio bearer established by the small cell.

The small cell provided by the embodiment of the present invention may be applied to the first embodiment of the corresponding method mentioned above. For details, please refer to the description of the first embodiment, and repeated description is omitted herein.

Seventh Embodiment

Figure 9:
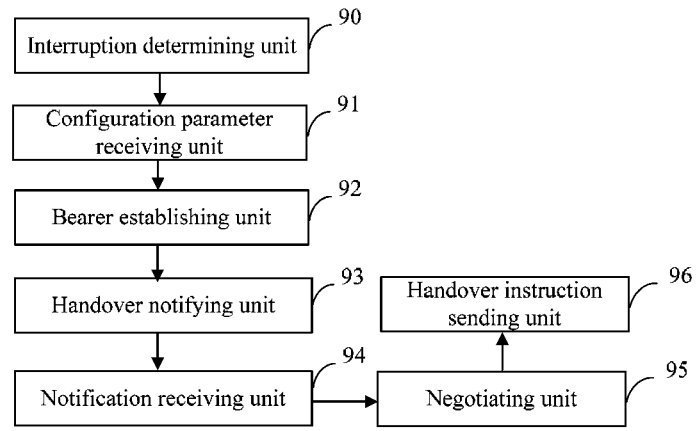
FIG. 9 is a block diagram of a structure of a small cell provided by a seventh embodiment of the present invention.

FIG. 9 shows a block diagram of a specific structure of a small cell provided by the seventh embodiment of the present invention, in which only a part of the small cell related to the embodiments of the present invention is depicted so as to facilitate illustration. In the present embodiment, the small cell includes an interruption determining unit 90, a configuration parameter receiving unit 91, a bearer establishing unit 92, a handover notifying unit 93, a notification receiving unit 94, a negotiating unit 95 and a handover instruction sending unit 96.

Functions of the interruption determining unit 90, the configuration parameter receiving unit 91, the bearer establishing unit 92 and the handover notifying unit 93 are the same as that of the interruption determining unit 80, the configuration parameter receiving unit 81, the bearer establishing unit 82 and the handover notifying unit 83 in the sixth embodiment, which will not be described reluctantly herein.

After the handover notifying unit 93 notifies the user equipment to hand over the signaling radio bearer transmission connection between the user equipment and the macro base station to the signaling radio bearer established by the small cell and the user equipment detects that strength of a signal transmitted by the macro base station is higher than a preset threshold, the notification receiving unit 94 receives a notification sent by the user equipment for recovering the signaling radio bearer transmission connection between the user equipment and the macro base station.

After the notification receiving unit 94 receives the notification sent by the user equipment for recovering the signaling radio bearer transmission connection between the user equipment and the macro base station, the negotiating unit 95 is used for negotiating with the macro base station, so that the macro base station reestablishes the signaling radio bearer for the user equipment.

The handover instruction sending unit 96 sends, after the negotiating unit 95 enables the macro base station to reestablish the signaling radio bearer for the user equipment, an instruction to the user equipment so that the user equipment returns back to a macro network covered by the macro base station.

The small cell provided by the embodiment of the present invention may be applied to the second embodiment of the corresponding method described above. For details, please refer to the description of the second embodiment, and repeated description is omitted herein.

Eighth Embodiment

Figure 10:
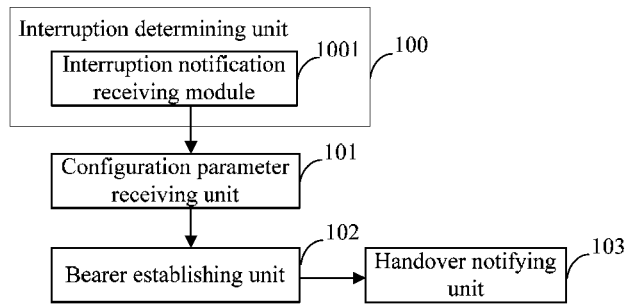
FIG. 10 is a block diagram of a structure of a small cell provided by a eighth embodiment of the present invention.

FIG. 10 shows a block diagram of a specific structure of a small cell provided by the eighth embodiment of the present invention, in which only a part of the small cell related to the embodiments of the present invention is depicted so as to facilitate illustration. In the present embodiment, the small cell includes an interruption determining unit 100, a configuration parameter receiving unit 101, a bearer establishing unit 102 and a handover notifying unit 103.

Functions of the configuration parameter receiving unit 101, the bearer establishing unit 102 and the handover notifying unit 103 are the same as that of the configuration parameter receiving unit 81, the bearer establishing unit 82 and the handover notifying unit 83 in the sixth embodiment, which will not be described reluctantly herein.

Particularly, in the present embodiment, the interruption determining unit 100 includes an interruption notification receiving module 1001, wherein the module is used for receiving a notification sent by the user equipment that the signaling radio bearer transmission connection is interrupted.

The small cell provided by the embodiment of the present invention may be applied to the third embodiment of the corresponding method mentioned above. For details, please refer to the description of the third embodiment, and repeated description is omitted herein.

Ninth Embodiment

Figure 11:
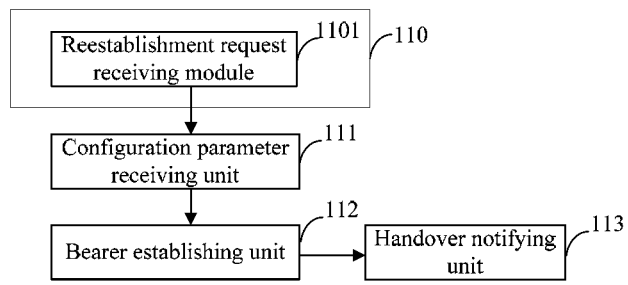
FIG. 11 is a block diagram of a structure of a small cell provided by a ninth embodiment of the present invention.

FIG. 11 shows block diagram of a specific structure of a small cell provided by the ninth embodiment of the present invention, in which only a part of the small cell related to the embodiment of the present invention is depicted so as to facilitate illustration. In the present embodiment, the small cell includes an interruption determining unit 110, a configuration parameter receiving unit 111, a bearer establishing unit 112 and a handover notifying unit 113.

Functions of the configuration parameter receiving unit 111, the bearer establishing unit 112 and the handover notifying unit 113 are the same as that of the configuration parameter receiving unit 81, the bearer establishing unit 82 and the handover notifying unit 83 in embodiment 9, which will not be described reluctantly herein.

Particularly, the interruption determining unit 110 includes a reestablishment request receiving module 1101, wherein the module is used for receiving a request for reestablishing a signaling radio bearer transmission connection sent by the macro base station.

The small cell provided by the embodiment of the present invention may be applied to the fourth embodiment of the corresponding method mentioned above. For details, please refer to the description of the fourth embodiment, and repeated description is omitted herein.

Tenth Embodiment

FIG. 12 shows an implementing procedure of a processing method for a radio link failure provided by the tenth embodiment of the present invention. Taking an eNodeB side as example, the method is suitable for the scenario that the eNodeB directly instructs, when the eNodeB firstly detects that a control plane radio link with the UE is failed and the UE has not found that the control plane radio link is failed yet, the small cell to reestablish an RRC connection of the UE, so as to establish the RRC connection of the UE on the small cell. Details of the method are described as follows.

In step S121, the eNodeB sends a request for reestablishing a signaling radio bearer transmission connection to the small cell.

In step S122, SRB configuration parameters are sent to the small cell.

In the present embodiment, after the small cell establishes an SRB according to the SRB configuration parameters sent by the eNodeB, control signaling can be sent to the UE through the established SRB.

Eleventh Embodiment

FIG. 13 shows an implementing procedure of a processing method for a radio link failure provided by the eleventh embodiment of the present invention. Taking an eNodeB side as an example, the method is suitable for the scenario that UE firstly detects that a control plane radio link between the UE and an eNodeB is failed. The details of the method are described as follows.

In step S131, the eNodeB receives a request for reestablishing a signaling radio bearer transmission connection sent by the small cell.

In step S132, SRB configuration parameters are sent to the small cell.

In the present embodiment, after the small cell establishes an SRB according to the SRB configuration parameters sent by the eNodeB, control signaling can be sent to the UE through the established SRB.

Twelfth Embodiment

FIG. 14 shows a block diagram of a specific structure of a macro base station provided by the twelfth embodiment of the present invention, in which only a part of the macro base station related to the embodiments of the present invention is depicted so as to facilitate illustration. In the present embodiment, the macro base station includes a reestablishment request sending unit 141 and a configuration parameter sending unit 142.

The reestablishment request sending unit 141 is used for sending a request for reestablishing a signaling radio bearer transmission connection to the small cell.

The configuration parameter sending unit 142 is for sending SRB configuration parameters to the small cell.

Thirteenth Embodiment

FIG. 15 shows a block diagram of a specific structure of a macro base station provided by the thirteenth embodiment of the present invention, in which only a part related to the embodiment of the present invention is depicted so as to facilitate illustration. In the present embodiment, the macro base station includes a reestablishment request receiving unit 151 and a configuration parameter sending unit 152.

The reestablishment request receiving unit 151 is used for receiving a request for reestablishing a signaling radio bearer transmission connection sent by the small cell.

The configuration parameter sending unit 152 is used for sending SRB configuration parameters to the small cell.

Fourteenth Embodiment

Figure 16:
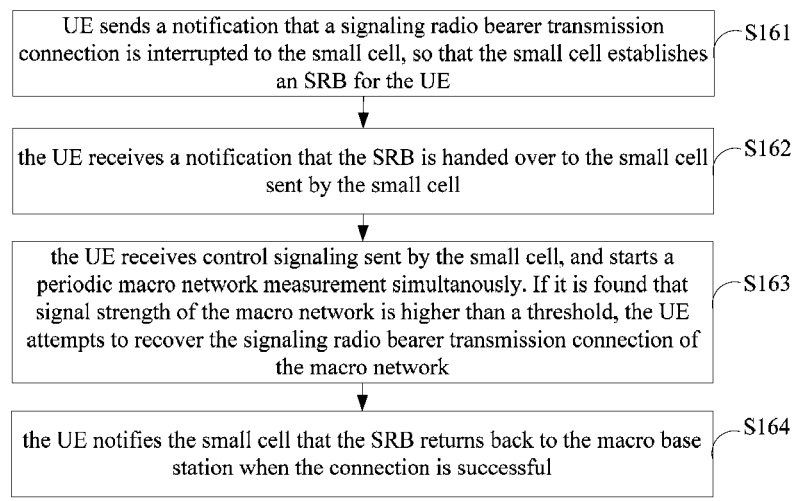
FIG. 16 is an implementing flowchart of a processing method for a radio link failure provided by a fourteenth embodiment of the present invention.

FIG. 16 shows an implementing procedure of a processing method for a radio link failure provided by the fourteenth embodiment of the present invention. Taking UE side as an example, the method is suitable for the scenario that UE firstly detects that a control plane radio link between the UE and an eNodeB is failed. The details of the method are described as follows.

In step S161, the UE sends a notification to the small cell that a signaling radio bearer transmission connection is interrupted, so that the small cell establishes an SRB for the UE.

In step S162, the UE receives a notification for handing over the SRB to the small cell sent by the small cell.

In step S163, the UE receives control signaling sent by the small cell, and starts a periodic macro network measurement simultaneously. If it is found that signal strength of the macro network is higher than a threshold, the UE attempts to recover the signaling radio bearer transmission connection of the macro network.

In step S164, the UE notifies the small cell that the SRB returns back to the macro base station when the connection is successful.

Fifteenth Embodiment

Figure 17:
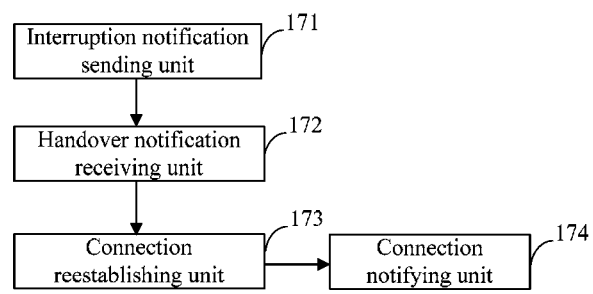
FIG. 17 is a block diagram of a structure of a user equipment provided by a fifteenth embodiment of the present invention.

FIG. 17 shows a block diagram of a specific structure of a user equipment provided by the fifteenth embodiment of the present invention, in which only a part related to the embodiment of the present invention is depicted so as to facilitate illustration. In the present embodiment, the user equipment includes an interruption notification sending unit 171, a handover notification receiving unit 172, a connection reestablishing unit 173 and a connection notifying unit 174.

The interruption notification sending unit 171 is used for sending a notification to a small cell that a signaling radio bearer transmission connection is interrupted, so that the small cell establishes an SRB for the UE.

The handover notification receiving unit 172 is used for receiving a notification for handing over the SRB to the small cell sent by the small cell.

The connection reestablishing unit 173 is used for receiving control signaling sent by the small cell, starting a periodic macro network measurement simultaneously, and attempting to recover the signaling radio bearer transmission connection of the macro network if it is found that signal strength of the macro network is higher than a threshold.

The connection notifying unit 174 is used for notifying the small cell that the SRB returns back to the macro base station when the connection is successful.

Finally, the present invention also provides a mobile communication system. The mobile communication system includes the small cell provided by the sixth to ninth embodiments and the macro base station provided by the twelfth and the thirteenth embodiments. The small cell is deployed in a macro cell covered by the macro base station, and provides service for a UE in the macro cell.

It is to be noted that in the above-mentioned embodiment of the system, the respective units included thereof are merely divided according to function logic, but the present invention is not limited thereto as long as the corresponding functions can be achieved. In addition, the specific names of the respective function units are merely used to makes it convenient to distinguish from each other, rather than to limit the protection scope of the present invention.

In addition, it should be appreciated for those of ordinary skill in the art that all or a part of the procedures in the above-mentioned embodiments of a method may be implemented with a computer program instructing corresponding hardware. The corresponding program may be stored in a computer readable storage medium, such as a ROM/RAM, a disk, a compact disk, or the like.

The foregoing descriptions are merely preferred specific implementation manners of the invention, rather than limiting the protection scope of the invention. Any change equivalent substitution or improvement made within the spirit and principle of the present invention shall fall into the protection scope of the present invention.

What is claimed is:

1. A processing method for a radio link failure, comprising:
   in a case that a signaling radio bearer (SRB) between a user equipment (UE) and a macro base station is interrupted and a data link between the UE and a small cell keeps connected receiving, by the small cell, signaling radio bearer configuration parameters of the macro base station sent by the macro base station, wherein the signaling radio bearer configuration parameters comprise an SRB identification, a radio link control layer configuration, and a logic channel configuration;
   establishing an SRB for the UE and the small cell, according to the signaling radio bearer configuration parameters of the macro base station; and
   notifying the UE to transmit a radio resource control (RRC) message between the UE and the small cell on the SRB between the UE and the small cell, wherein the RRC message is transmitted by a dedicated traffic channel (DTCH) of the small cell.

2. The method according to claim 1, wherein after the notifying the UE to transmit the RRC message between the UE and the small cell on the SRB between the UE and the small cell the method further comprises:
   in response to detecting that strength of a signal transmitted by the macro base station is higher than a preset threshold, receiving, by the small cell, a notification sent by the UE for recovering the SRB between the UE and the macro base station;
   negotiating with the macro base station so that the macro base station reestablishes the SRB between the UE and the macro base station for the UE; and
   sending an instruction to the UE so as to enable the UE to return to a macro network covered by the macro base station.

3. The method according to claim 1, wherein the method further comprises:
   receiving, by the small cell, a notification sent by the UE that the SRB between the UE and the macro base station is interrupted.

4. The method according to claim 1, wherein the method further comprises:
   receiving, by the small cell, a request for establishing the SRB between the UE and the small cell sent from the macro base station.

5. A small cell, comprising:
   a processor; and
   a memory having processor-executable instructions stored thereon that, when executed on the processor, cause the small cell to:
      receive signaling radio bearer configuration parameters of a macro base station sent by the macro base station, in a case that a signaling radio bearer (SRB) between a user equipment (UE) and the macro base station is interrupted and a data link between the UE and the small cell keeps connected, wherein the signaling radio bearer configuration parameters comprise an SRB identification, a radio link control layer configuration, and a logic channel configuration;
      establish an SRB for the UE and the small cell, according to the signaling radio bearer configuration parameters of the macro base station; and notify the UE to transmit a radio resource control (RRC) message between the UE and the small cell on the SRB between the UE and the small cell, wherein the RRC message is transmitted by a dedicated traffic channel (DTCH) of the small cell.

6. The small cell according to claim 5, wherein the processor-executable instructions, when executed on the processor, further cause the small cell to:
receive a notification sent by the UE for recovering the SRB between the UE and the macro base station;
negotiate, after receiving the notification sent by the UE for recovering the SRB between the UE and the macro base station, with the macro base station so that the macro base station reestablishes the SRB between the UE and the macro base station for the UE; and
send an instruction to the UE after enabling the macro base station to reestablish the SRB for the UE, so as to enable the UE to return to a macro network covered by the macro base station.

7. The small cell according to claim 5, wherein the processor-executable instructions, when executed on the processor, further cause the small cell to:
receive a notification sent by the UE that the SRB between the UE and the macro base station is interrupted.

8. The small cell according to claim 5, wherein the processor-executable instructions, when executed on the processor, further cause the small cell to:
receive a request for reestablishing the SRB between the UE and the small cell sent by the macro base station.

9. A processing method for a radio link failure, comprising:
sending, by a macro base station, signaling radio bearer configuration parameters of the macro base station to a small cell, in a case that a signaling radio bearer (SRB) between a user equipment (UE) and the macro base station is interrupted and a data link between the UE and the small cell keeps connected,
wherein the signaling radio bearer configuration parameters comprise an SRB identification, a radio link control layer configuration, and a logic channel configuration, and
wherein the signaling radio bearer configuration parameters are used for the small cell to establish an SRB between the UE and the small cell.

10. The method according to claim 9, wherein before the sending, by the macro base station, the SRB configuration parameters to the small cell, the method further comprises:
sending, by the macro base station, a request for reestablishing the SRB between the UE and the macro base station to the small cell; or
receiving, by the macro base station, a request for reestablishing the SRB between the UE and the macro base station sent by the small cell.

11. A macro base station, comprising:
a processor; and
a memory having processor-executable instructions stored thereon that, when executed on the processor, cause the macro base station to:
send signaling radio bearer configuration parameters of the macro base station to a small cell, in a case that a signaling radio bearer (SRB) between a user equipment (UE) and the macro base station is interrupted and a data link between the UE and the small cell keeps connected,
wherein the signaling radio bearer configuration parameters comprise an SRB identification, a radio link control layer configuration, and a logic channel configuration, and
wherein the signaling radio bearer configuration parameters are used for the small cell to establish an SRB between the UE and the small cell.

12. The macro base station according to claim 11, wherein the processor-executable instructions, when executed on the processor, further cause the macro base station to:
send a request for reestablishing the SRB between the UE and the macro base station to the small cell.

13. The macro base station according to claim 11, wherein the processor-executable instructions, when executed on the processor, further cause the macro base station to:
receive a request for reestablishing the SRB between the UE and the macro base station sent by the small cell.

14. A processing method for a radio link failure, comprising:
determining, by a user equipment (UE), a signaling radio bearer (SRB) between the UE and a macro base station is interrupted and a data link between the UE and a small cell keeps connected;
sending, by the UE, to the small cell, a notification that the SRB between the UE and the macro base station is interrupted instead of returning to a radio resource control (RRC)_IDLE state, such that the small cell establishes an SRB between the UE and the small cell;
receiving a notification sent by the small cell for transmitting a radio resource control (RRC) message between the UE and the small cell on the SRB between the UE and the small cell; and
transmitting the RRC message between the UE and the small cell by a dedicated traffic channel (DTCH) of the small cell on the SRB between the UE and the small cell.

15. The method according to claim 14, further comprising:
receiving a control signaling sent by the small cell, starting a periodic macro network measurement at the same time, and attempting to recover the SRB between the UE and the macro base station of the macro network if strength of a signal of the macro network is found to be higher than a threshold; and
notifying the small cell that the SRB has returned to the macro base station after successfully connecting to the macro network.

16. A user equipment (UE), comprising:
a processor; and
a memory having processor-executable instructions stored thereon that, when executed on the processor, cause the UE to:
determine that a signaling radio bearer (SRB) between the UE and a macro base station is interrupted and a data link between the UE and a small cell keeps connected;
send to a small cell a notification that the SRB between the UE and the macro base station is interrupted instead of returning to a radio resource control (RRC)_IDLE state, such that the small cell establishes an SRB between the UE and the small cell;
receive a notification sent by the small cell for transmitting a radio resource control (RRC) message between the UE and the small cell on the SRB between the UE and the small cell; and transmit the RRC message between the UE and the small cell by a dedicated traffic channel (DTCH) of the small cell on the SRB between the UE and the small cell.

17. The UE according to claim 16, wherein the processor-executable instructions, when executed on the processor, further cause the UE to:

receive a control signaling sent by the small cell, start a periodic macro network measurement at the same time, and attempt to recover the SRB between the UE and the macro base station of the macro network if strength of a signal of the macro network is found to be higher than a threshold; and notify the small cell that the SRB has returned to the macro base station after successfully connecting to the macro network.

* * * * *